Oct. 1, 1963 E. W. WERTS 3,105,919
ADJUSTABLE TIME DELAY UNDERVOLTAGE PROTECTIVE CIRCUIT
Filed Jan. 19, 1962
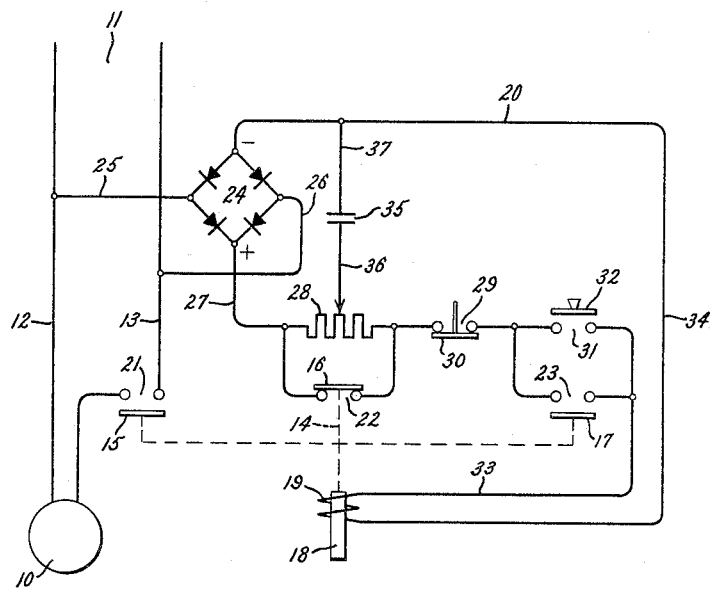
INVENTOR:
EVERETT W. WERTS,
BY David M. Schiller
ATTORNEY.

United States Patent Office 3,105,919
Patented Oct. 1, 1963

3,105,919
ADJUSTABLE TIME DELAY UNDERVOLTAGE
PROTECTIVE CIRCUIT
Everett W. Werts, Normal, Ill., assignor to General
Electric Company, a corporation of New York
Filed Jan. 19, 1962, Ser. No. 167,367
7 Claims. (Cl. 317—31)

This invention relates to protective circuits and particularly to adjustable time delay protective circuits for alternating current motors for maintaining connection of the motor to an energizing circuit during momentary dips in or loss of voltage of the energizing circuit.

In many alternating current installations a load, such as a motor, is connected for energization from a source of alternating voltage under the control of a magnetic switch, such as a magnetic contactor. In such installations it is desirable to make provision for maintaining energization of the magnetic contactor so that the motor remains connected to the load during voltage dips in the energizing circuit. It is desirable also that the means for performing this function include an adjustable time delay feature so that the contactor will remain energized following a voltage dip for a time period which is adjustable.

Previous circuits designed to perform the above described function have not been entirely satisfactory in that they have either not provided an adequate range of adjustment of the time delay, have effected undesirable variation of the value of one or both of the contactor normal hold-in current and the contactor initial hold-in current as a result of adjustment of the time delay, or have incorporated a large number of expensive components. The contactor normal hold-in current refers to the value of current flowing through the contactor coil under normal conditions of voltage of the contactor energizing circuit, and the contactor initial hold-in current refers to the value of current flowing through the contactor coil immediately following a dip in voltage of the energizing circuit.

It is accordingly a primary object of the present invention to provide a novel and improved adjustable time delay undervoltage protective circuit for maintaining energization of a load controlling magnetic switch during dips in load energizing voltage which incorporates a minimum number of relatively inexpensive parts.

It is another object of the invention to provide a novel and improved circuit for maintaining energization of a load controlling magnetic switch during dips in load energizing voltage which includes adjustable means for varying over a considerable range the time of switch energization following a voltage dip while maintaining substantially constant and equal the switch normal hold-in current and the switch initial hold-in current for any adjustment of such means.

It is a further object of the invention to provide a novel and improved protective circuit for maintaining energization of a load controlling magnetic switch by discharge of a capacitor during a dip in load energizing voltage with means for varying the time of switch energization from the capacitor over a considerable range sufficient to accommodate variations in switch characteristics and capacitor tolerances.

In carrying out the invention in one preferred form, a protective circuit is provided for maintaining energization of a magnetic contactor during dips in voltage of a load energizing circuit so as to maintain connection of the load to the energizing circuit during such dips. The protective circuit includes rectifier means connected for energization from the load energizing circuit to produce a direct voltage output. An RC timing circuit is provided including a resistor connected in series circuit with the operating coil of the contactor with the series circuit being connected for energization in accordance with the direct voltage output of the rectifier. The RC timing circuit includes also a capacitor which is connected across the rectifier means in adjustable sliding contact with the resistor so as to be charged with a variable direct voltage from the rectifier means and to be discharged through a variable portion of the resistance and through the operating coil. The arrangement is such so as to provide a considerable range of adjustment of the contactor dropout delay time while maintaining the capacitor initial discharge current and therefore, the contactor initial hold-in current, and also the contactor normal hold-in current substantially constant and equal for any particular adjustment of the resistor.

Other objects of the invention will become apparent from the following description taken in conjunction with the accompanying drawing in which the single FIGURE is a schematic representation of a protective circuit embodying the teachings of the present invention.

Referring now to the drawing there is illustrated in the single figure a schematic representation showing a protective circuit employed in connection with a load device, such as an alternating current motor 10, connected for energization from a voltage source (not shown) through an alternating current circuit 11 including conductors 12 and 13. The circuit 11 is shown as a single phase circuit but the invention is applicable to other types of energizing circuits such as multiphase circuits.

The motor 10 is energized under control of a magnetic switch, such as a magnetic contactor represented generally by the numeral 14. The contactor 14 includes a number of movable electroconductive contacts 15, 16 and 17 which are mechanically connected to a magnetic plunger 18 for movement therewith as a unit in response to energization of an operating coil 19 surrounding the plunger 18. The operating coil 19 is connected for energization from the circuit 11 through the protective circuit which is represented generally by the numeral 20 and which is designed to maintain energization of the coil 19 sufficient to hold in the contactor during momentary dips in voltage or loss of voltage of the circuit 11 as will be described more fully hereinafter.

The contactor 14 is illustrated in a dropped out condition wherein the coil 19 is deenergized and the movable contacts 15, 16 and 17 are respectively spaced from, engaged with and spaced from associated fixed contacts 21, 22 and 23. When the coil 19 is energized by an amount sufficient to pick up the plunger 18, the contacts 15, 16 and 17 are moved upwardly as viewed in the drawing so that the contacts 15 and 17 engage the contacts 21 and 23, and the contact 16 is disengaged from the contacts 22. As will be described more fully hereinafter, the contacts 21 are in the circuit 11, the contacts 22 are in a shunt circuit for a circuit component of the circuit 20, and the contacts 23 are in a shunt circuit for a manually depressable start switch located in the circuit 20.

The protective circuit 20 according to the present invention includes a rectifier 24 shown in the form of a full wave bridge rectifier having a pair of input terminals connected respectively through conductors 25 and 26 to the conductors 12 and 13 of the circuit 11. The rectifier 24 also includes a pair of output terminals designated in the drawing by plus and minus signs and across which appears a direct current voltage generated in response to energization of the input terminals of the rectifier. A series circuit is connected across the output terminals of the rectifier 24 and such circuit may be traced from the positive output terminal of the rectifier through a wire 27, a resistor 28, normally closed contacts 29 cooperating with a manually operable stop switch 30, normally open contacts 31 adapted to cooperate with a manually operable start switch 32, a wire 33, the contactor operating coil 19, and a wire 34 back to the negative output terminal of the rectifier 24.

In order to provide an adjustable contactor drop out delay time the present invention provides a unique RC network including the resistor 28 and also including a capacitor 35 connected in adjustable sliding contact with resistor 28 to be charged with a variable direct voltage derived from the rectifier output terminals and to be discharged during voltage dips through a variable portion of the resistor 28 and through the operating coil 19. For this purpose, the capacitor 35 has one plate thereof connected through an adjustable tap 36 in sliding contact with the resistor 28, and has its other plate connected through a wire 37 to the negative output terminal of the rectifier 24.

With the described arrangement, adjustment of the tap 36 to the right as viewed in the drawing from the position shown reduces the contactor drop out delay period by decreasing the voltage to which the capacitor 35 is charged. Such adjustment also decreases the resistance of resistor 28 through which the capacitor is to be discharged and as a consequence, the initial discharge current of the capacitor is maintained substantially constant for the adjustment to the right. Adjustment of tap 36 to the left from the position shown increases the drop out delay period by increasing the capacitor charging voltage, and at the same time the resistance of resistor 28 through which the capacitor is discharged is also increased. It is thus seen that the initial discharge current of the capacitor and therefore, the initial contactor hold-in current will remain substantially constant for any adjustment of the tap 36 along resistor 28. In circuits heretofore constructed the time delay function has been provided by an RC network arranged such that adjustment of the value of one of the network components causes also a variation in initial hold-in current of the contactor. This is an undesirable arrangement in that to obtain an adequate range of adjustment the initial contactor hold-in current is necessarily varied over extremely wide limits which can result in either objectionable heat generation in the timing resistor or in a small initial hold-in current barely capable of holding in the contactor.

In operation, the adjustable tap 36 is set to the point on resistor 28 effective for maintaining energization of the coil 19 during expected dips in voltage of the circuit 11. The start button 32, which is spring-biased to the open position, is then actuated to close contacts 31 which permits current to flow through the rectifier 24 and through the coil 19 to energize the coil 19 and pick up the plunger 18 to move the contacts 15 and 17 into engagement with the contacts 21 and 23 and to move contact 16 out of engagement with contacts 22. It is noted that the initial inrush of current following actuation of start button 32 passes through a shunt circuit about the resistor 28 which is established by the normally closed condition of the contacts 16 and 22. Therefore, the initial inrush current flows directly to the coil 19 and is largely independent of the setting of tap 36 on the resistor 28. Closure of contacts 15 and 21 effects energization of motor 10 and closure of contacts 17 and 23 establishes a sealing circuit around the contacts 31 to maintain energization of coil 19 when the button 32 is released. When contacts 16 and 22 open, resistor 28 serves to limit current through the coil 19 to the desired normal hold-in value. Since the entire resistance of resistor 28 is presented to the coil energizing current, the contactor normal hold-in current is largely independent of the setting of tap 36, and the resistance of the resistor 28 is thereby selected to pass a current which will reliably hold in the contactor.

During normal operation of the circuit the capacitor 35 is charged with a voltage dependent upon the position of the adjustable tap 36 along resistor 28. With the tap 36 adjacent the left hand end of resistor 28, the capacitor 35 would be charged to substantially the full voltage appearing at the output terminals of rectifier 24, there being very little voltage drop across the portion of resistor 28 between the tap 36 and the positive terminal of the rectifier. For other positions of the tap 36 progressively toward the right as shown in the drawing, the voltage to which capacitor 35 is charged becomes progressively smaller, there being a progressive increase in the voltage drop across the increasing portions of resistor 28 between tap 36 and the positive terminal of the rectifier.

In the event that voltage of circuit 11 drops to a relatively low value, the capacitor 35 discharges through a path which may be traced from the tap 36, through a selected portion of resistor 28, closed contacts 29 and 30, closed contacts 17 and 23, wire 33, coil 19, and wire 34 back to the capacitor through wire 37. The arrangement is such that the ratio of the rectifier output voltage to the entire resistance of resistor 28 is substantially equal to the ratio of voltage to which the capacitor is charged to the portion of resistance of resistor 28 through which the capacitor is discharged for any setting of tap 36. Consequently, the initial discharge current of the capacitor and therefore, the contactor initial hold-in current is always substantially equal to the contactor normal hold-in current for any setting of tap 36. The contactor will remain energized until the capacitor discharge current decays to the contactor drop-out current value after elapse of a period of time determined by the setting of the tap 36.

As previously pointed out, the initial value of the capacitor discharge current and therefore, the contactor initial hold-in current, and also the contactor normal hold-in current remains substantially constant and equal for any position of the tap 36 along resistor 28. This is in contrast to previous designs wherein adjustment of the value of a resistor to vary the time delay has resulted in undesirable variation of one or both of the contactor initial hold-in current and the contactor normal hold-in current. It is thus seen that the time constant of the discharge circuit is varied by varying the resistance between the adjustable tap 36 and the right hand terminal of resistor 28. Also, the resistance of resistor 28 between the left hand terminal thereof and the tap 36 serves as a current limiting resistance in the charging circuit of the capacitor.

Although the invention has been described with reference to a certain specific embodiment thereof, numerous modifications are possible, and it is desired to cover all modifications falling within the scope of the appended claims.

What I claim as new and desire to secure by Letters Patent of the United States is:

1. An adjustable time delay undervoltage protective circuit for an alternating current load, comprising a contactor having an operating coil and a control contact for controlling energization of the load from an energizing circuit, rectifier means to be connected for energization from the energizing circuit for the load, said rectifier means having an output circuit at which appears a direct voltage, a resistor connected in series circuit with said operating coil with the series circuit connected for energization from said rectifier output circuit, and a capacitor connected in adjustable contact with said resistor to be charged with a variable direct voltage from said rectifier output circuit and to be discharged through a variable portion of said resistor and through said operating coil.

2. A circuit as defined in claim 1 wherein said rectifier means comprises a full wave rectifier having a pair of output terminals, said resistor and said operating coil being connected in series across said output terminals.

3. A circuit as defined in claim 1 wherein said contactor includes an additional control contact having a first position effective to shunt said resistor when the contactor is dropped out, and having a second position effective to insert said resistor in series with said operating coil when the contactor is picked up.

4. An adjustable time delay undervoltage protective circuit for an alternating current load, comprising a contactor having an operating coil and a control contact for controlling energization of the load from an energizing circuit, rectifier means to be connected for energization from the energizing circuit for the load, said rectifier means having an output circuit at which appears a direct voltage, and an RC timing circuit including a resistor connected in series circuit with said operating coil with the series circuit connected for energization from said rectifier output circuit, and a capacitor connected across said retifier output circuit in adjustable contact with said resistor, said capacitor being included in a charging circuit and a discharging circuit both of which contain an adjustable portion of said resistor.

5. A circuit as defined in claim 4 wherein said rectifier means comprises a full wave rectifier having a pair of output terminals, said resistor and said operating coil being connected in series across said output terminals.

6. An adjustable time delay undervoltage protective circuit for an alternating current load, comprising a contactor having an operating coil and a control contact for controlling energization of the load from an energizing circuit, a full wave rectifier having a pair of input terminals to be connected for energization from the energizing circuit for the load, and having a pair of output terminals at which appears a direct voltage, a resistor connected in series circuit with said operating coil, one end of said resistor being connected to the positive output terminal of said rectifier and one end of said operating coil being connected to the negative output terminal of said rectifier, and a capacitor connected across said rectifier output terminals and including a first terminal connected to the negative terminal of said rectifier and a second terminal in sliding contact with said resistor such that said capacitor is charged through a variable portion of said resistor with a varible direct voltage from said rectifier and is discharged through a variable portion of said resistor and through said operating coil.

7. A circuit as defined in claim 6 wherein said contactor includes an additional control contact having a first position effective to shunt said resistor when the contactor is dropped out, and having a second position effective to insert the resistor in series with said operating coil when the contactor is picked up.

No references cited.